Patented Apr. 15, 1924.

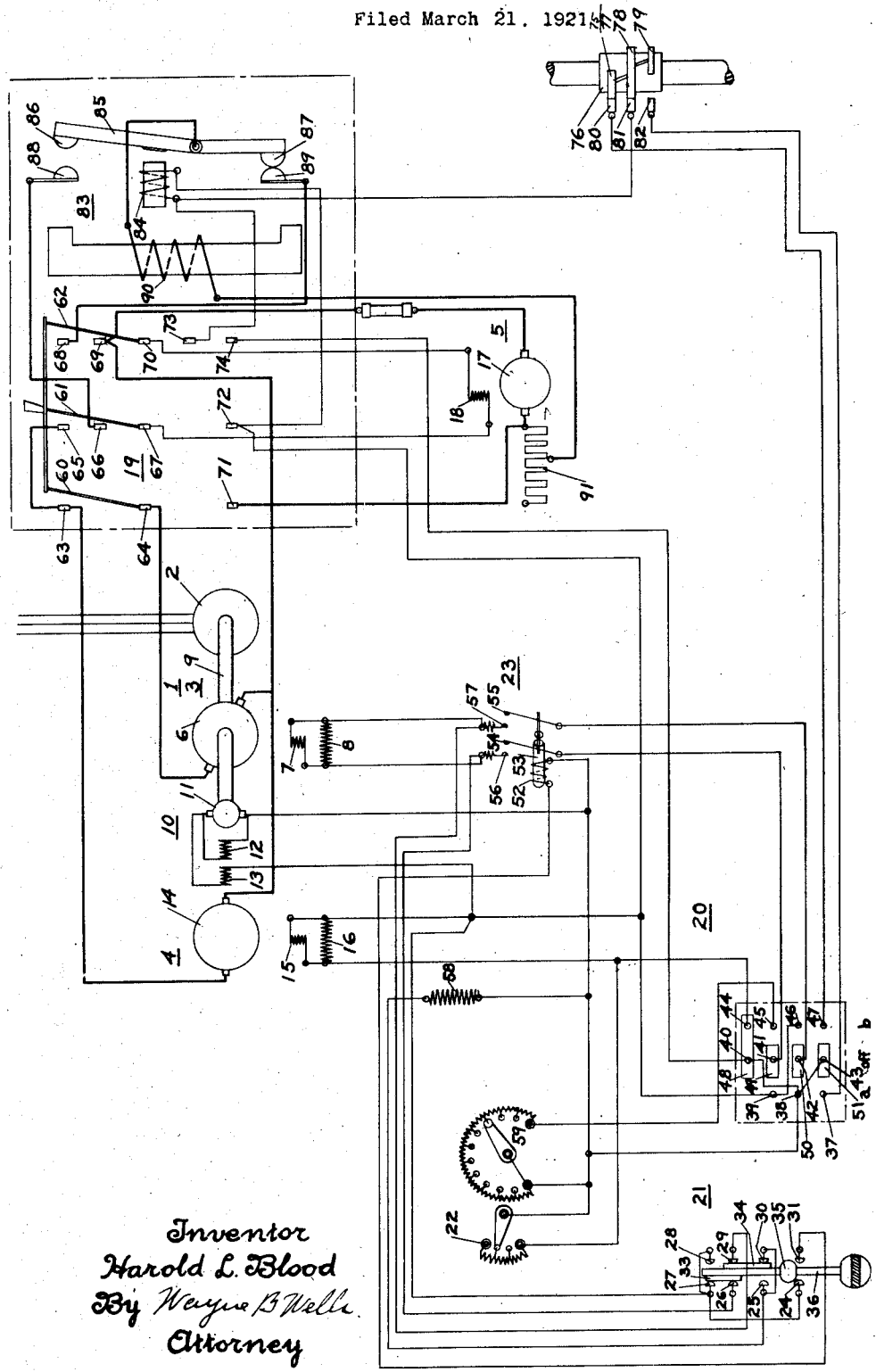

1,490,412

UNITED STATES PATENT OFFICE.

HAROLD L. BLOOD, OF PLAINFIELD, NEW JERSEY, ASSIGNOR TO NILES-BEMENT-POND COMPANY, OF NEW YORK, N. Y., A CORPORATION OF NEW JERSEY.

PLANER-CONTROL SYSTEM.

Application filed March 21, 1921. Serial No. 454,171.

*To all whom it may concern:*

Be it known that I, HAROLD L. BLOOD, a citizen of the United States, residing at Plainfield, in the county of Union and State of New Jersey, have invented certain new and useful Improvements in Planer-Control Systems, of which the following is a specification.

My invention relates to planer control systems, and particularly to planer control systems having electric feed motors.

One object of my invention is to provide a planer control system having a motor-generator set for operating the main and the feed motor that shall be provided with means for controlling the direction of rotation of the main motor by governing the direction of current flow from the motor-generator set and that shall intermittently operate the feed motor in a uniform direction in accordance with the operation of the planer table.

Another object of my invention is to provide a control system of the above indicated character with a traverse switch that shall connect the main motor for operation by a pilot or a pendent switch and the feed motor for intermittent operation in uniform direction when in one position, and that shall connect the feed motor for continuous operation in a uniform direction and insure the main motor against operation when in a second position.

For details of construction of a planer adapted to be operated by my control system, reference may be had to the patent to G. E. Greenleaf and H. L. Blood, No. 1,321,203, dated November 11th, 1919. Some of the electrical features of the invention are in some respects similar to those set forth in my Patent No. 1,389,342, dated August 30, 1921.

The single figure in the accompanying drawing is a diagrammatic view of a control system constructed in accordance with my invention.

Referring to the accompanying drawing, a motor-generator set 1, comprising an alternating-current motor 2 and a direct-current generator 3, is provided for supplying current to a main motor 4 and a feed motor 5.

The alternating-current motor 2 is connected to any suitable supply circuit and is preferably connected to a three phase supply circuit, as illustrated in the drawing. The generator 3 comprises an armature 6 and a field-magnet winding 7 which is protected by a choke coil 8. The generator 3 is preferably directly connected to the motor 2 by means of a shaft 9 and a small exciter generator 10 is preferably connected to the motor 2 by means of the shaft 9. The exciter generator 10 comprises an armature 11, a shunt field-magnet winding 12 and a series field-magnet winding 13.

The main motor 4 comprises an armature 14 and a field-magnet winding 15 which is protected by a choke coil 16. The main motor 4 serves to reciprocate the table of a planer in any well known manner, as disclosed in the patent No. 1,321,203. The feed motor 5 comprises an armature 17 and a field-magnet winding 18 which is connected across the terminals of the generator 3 by means of a traverse switch 19. The feed motor 5 serves to control the movement of the tool head of a planer across the work being operated upon.

A pendent switch 21 is provided for controlling the direction of rotation of the main motor 4 at will, and a pilot switch 20 is provided for controlling the rotation of the main motor in accordance with the operation of the planer table. The pendent switch 21 and the pilot switch 20 serve to control the direction of current flow from the exciter generator 10 through the generator field-magnet winding 7. Thus the direction of current flow through the main motor 4 is varied to control the direction of rotation of such motor. The field-magnet winding 15 of the main motor 4 is connected across the terminals of the exciter generator 10 either directly or through a rheostat 22 by means of the pilot switch 20.

An interlock switch 23, which is controlled by the pendent switch 21, is provided for disconnecting the pilot switch from any control of the generator field-magnet winding 7 upon operation of the pendent switch.

The pendent switch 21 comprises eight stationary contact members 24 to 31, inclusive, and three contact segments 33, 34 and 35 which are mounted on the core 36 of the pendent switch. The contact segment 35 serves to bridge contact members 24 and 31, when the switch is in its lowermost position, to energize the coil of the interlock switch 23. The contact segment 34 bridges either the contact members 29 and 30 or the contact members 25 and 26, according to the direction of rotation of the main motor that is desired. In a like manner, the contact segment 33 bridges either the contact members 26 and 27 or the contact members 28 and 29, according to the operation of the main motor that is desired. Normally, the pendent switch is maintained in its lowermost position to close the interlock switch 23.

When the interlock switch 23 is closed, the planer is controlled solely by the pilot switch 20. Whenever it is desired to operate the planer table, at will, by means of the pendent switch, the core member 36 of the switch is raised to disconnect the contact segment 35 from the contact members 24 and 31 and then is given a movement in rotation to selectively bridge the contact members 25 to 30, inclusive, by means of the contact segments 33 and 34.

The pilot switch 20 comprises eleven stationary contact members 37 to 47 inclusive and four movable contact segments 48 to 51 inclusive. The switch is shown in the off position and when moved to the right, as shown in the drawing, to the position $b$, current is supplied to the main motor 4 for so rotating it as to effect a cutting stroke by the planer table. When the pilot switch is rotated towards the left, as shown in the drawing, to the position $a$, current is supplied to the main motor 4 for so rotating it as to return the planer table to the initial position. For a more complete description of the operation of the pilot switch 20, reference may be had to the patent to G. E. Greenleaf and H. L. Blood.

The interlock switch 23 comprises an energizing coil 52, which is controlled by the pendent switch 21, a core armature 53 and two movable contact members 54 and 55 which are adapted to engage two stationary contact members 56 and 57 when the switch is in an operative position. The interlock switch member 23 serves to prevent the pilot switch 20 from effecting any control of the generator field-magnet winding 7 when the pendent switch is being operated.

A resistor 58 is provided in circuit with the exciter generator 10, when the pendent switch is being operated, to prevent operation of the main motor 4 at an excessive speed. A rheostat 59 is provided in circuit with the generator field-magnet winding 7 during the cutting stroke for preventing the operation of the main motor 4 at an excessive speed. During the return of the planer table, the rheostat 59 is excluded from the circuit of the field-magnet winding 7 to increase the speed of the motor 4. The rheostat 22 is included in the circuit of the motor field-magnet winding 15 during the return stroke of the planer table to increase the speed of such operation.

The traverse switch 19, which is illustrated as a three-pole, double throw switch, comprises three contact blades 60, 61 and 62 which are adapted to connect three stationary contact members 64, 67 and 70 to stationary contact members 63, 65, 66, 68 and 69 when in the upper or feed position. When the switch is moved to the traverse position, the stationary contact members 64, 67 and 70 are connected to the stationary contact members 71, 72, 73 and 74. When the traverse switch 19 is in the feed position, the main motor 4 may be controlled either by the pilot switch 20 or by the pendent switch 21 and the feed motor 5 may be controlled by a limit switch 75. When the switch is in the traverse position, the main motor 4 is disconnected from the generator of the motor-generator set and the feed motor 5 is connected for continuous operation in a uniform direction.

The limit switch 75 comprises a drum 76 which is mounted upon any suitable shaft and is controlled by the feed motor 5. The drum 76 carries three contact segments 77, 78 and 79 which respectively engage stationary contact members 80, 81 and 82. The contact segment 78 extends completely around the drum 76 and continuously engages the contact member 81. The contact segments 77 and 79 are semi-circular in form. The limit switch 75 controls the operation of the feed-motor switch 83 which in turn controls the operation of the feed-motor 5 during the normal operation.

The switch 83 comprises an energizing coil 84 which governs the operation of a contact arm 85 in accordance with the operation of the limit switch 75. The contact arm 85 carries two contact members 86 and 87 which are respectively adapted to engage stationary contact members 88 and 89 according to the operation of the switch. Any suitable blow-out coil 90 is provided for extinguishing the arcs formed at the contact members. A resistor 91 is provided in circuit with the feed motor 5 and the switch 83 for dynamic braking purposes.

In describing the operation of the motors by the pilot switch 20, it is assumed the pendent switch is in position for bridging the contact members 24 and 31 to effect operation of the interlock switch 2 and the traverse switch 19 is in its upper or feed position. When the switch 19 is in the feed position, the armature 14 of the main motor 4 is connected directly across the terminals of the generator 3 by means of the switch blade 60 and the contact members 63 and 64.

When the planer table is at the end of the return stroke, the pilot switch is moved to position b. In such position of the pilot switch, the circuit for the generator field-magnet winding 7 extends from one terminal of the exciter generator 10 through the rheostat 59, contact members 45 and 41, which are bridged by contact segment 49, contact members 54 and 56, field-magnet winding 7, contact members 55 and 57, contact members 42 and 46, which are bridged by the contact segment 50, and the contact terminal 39 to the other terminal of the exciter generator 10.

The circuit for the field-magnet winding 15 of the main motor 4 extends from one terminal of the exciter generator 10 through the contact members 38, 40 and 44, contact segment 48 and the field-magnet winding 15 to the other terminal of the exciter generator. The contact segment which bridges the contact members 40 and 44 in this position of the pilot switch serves to short-circuit the rheostat 22 in order to increase the torque of the main motor during the feeding operation.

A circuit is completed for operating the switch 83 which extends from one terminal of the exciter generator 10 through the contact member 38, contact members 43 and 47, which are bridged by the contact segment 51, contact members 80 and 81, which are bridged by the contact segments 77 and 78, coil 84 of the switch 83 and the contact member 72 to the other terminal of the exciter generator 10. The switch 83 is operated to connect the contact members 86 and 88 and to disengage the contact members 87 and 89. Thereupon, a circuit is completed through the armature 17 of the feed motor 5. The circuit through the armature 17 extends from one terminal of the generator 3 through the contact member 69, armature 17, resistor 91, blow-out coil 90, contact arm 85, contact members 86 and 88, contact members 65 and 66, which are bridged by the switch blade 61, and contact members 63 and 64, which are bridged by the switch blade 60, to the other terminal of the generator 3. The field-magnet winding 18 of the feed motor 5 extends from one terminal of the generator 3 through the contact terminals 69 and 70, which are bridged by the switch blade 62, field-magnet winding 18, contact terminals 65 and 67, which are bridged by the switch blade 61, and the contact terminals 63 and 64, which are bridged by the switch blade 60 to the other terminal of the generator 3.

In the above manner the motor 5 is operated to effect a cross feed of the tool head of the planer. Upon a predetermined rotation of the feed motor 5, the stationary contact member 80 disengages the contact segment 77 to open the circuit of the coil 84. Thereupon, the contact arm 85 is released to effect disengagement of the contact members 86 and 88 and to effect engagement between the contact members 87 and 89. The circuit of the feed motor 5 to the generator 3 is interrupted and a dynamic braking circuit for the feed motor is completed which extends from one terminal of the armature 17 through the resistor 91, blow-out coil 84, contact arm 85, contact members 87 and 89, and the contact members 68 and 69, which are bridged by the switch blade 62, to the other terminal of the armature 17.

Upon completion of the feeding stroke, the pilot switch 20 is moved from position b to position a for completing circuits to return the planer table to initial position. At such time, the generator 3 is de-energized and the motor 4 acts as a generator to effect dynamic braking. It is desirable to have this dynamic braking circuit as powerful as possible without producing excessive current. In order to obtain these results, the field-magnet winding 15 is kept energized during braking. To this end the contact segment 48 is made long enough to connect the contact members 40 and 44 when the switch is in an intermediate or neutral position. This is important in order to insure a maximum braking effect not only during normal operation but also when the switch is manually thrown to neutral position to stop the planer.

In order to return the planer table to initial position, it is necessary to reverse the direction of rotation of the main motor 4. The reversing of the direction of rotation of motor 4 is effected by reversing the direction of current flow from the generator 3. Such reversal of current flow is effected by varying the direction of current flow through the generator field-magnet winding 7.

When the pilot switch is in position a, the circuit for the generator field-magnet winding 7 extends from one terminal of the exciter generator 10 through the contact members 38 and 42, which are bridged by contact segment 50, the contact members 57 and 55, field-magnet winding 7, contact members 54 and 56, and the contact members 39 and 41, which are bridged by the contact segment 49, to the other terminal of the exciter generator 10. The current flow through the field-magnet winding 7 is reversed and accordingly the current flow through the armature of the main motor 4 is changed to reverse the direction of rotation of such motor. It should be noted that the rheostat 59 is excluded from circuit to increase the voltage which is supplied by the generator 3 to the main motor.

The circuit for the field-magnet winding 15 of the main motor 4 extends from one terminal of the exciter generator 10 through the field-magnet winding 15 and the rheostat 22 to the other terminal of the exciter generator 10. The rheostat 22 is included in circuit with the field-magnet winding in order to reduce the excitation of the motor and accordingly increase the speed of its operation.

In such position of the pilot switch, a circuit is completed for the coil 84 of the switch 83 that extends from one terminal of the exciter generator 10 through the contact member 38, contact members 43 and 37, which are bridged by the contact segment 51, contact members 82 and 81, which are bridged by the segments 78 and 79, coil 84 and the contact terminal 72 to the other terminal of the exciter generator 10. The switch 83 is operated to again effect operation of the feed motor 5 in the manner above set forth. When the contact segment 79 is separated from the terminal 82, the switch 83 is released to de-energize the feed motor and to complete a dynamic braking circuit through the motor.

At the end of the return stroke, the pilot switch is moved from position $a$ to position $b$ and the above cycle of operations is again repeated. If it is desired to control the planer by means of the pendent switch, the interlock switch 23 is released by disconnecting the contact member 35 from the contact terminals 24 and 31. In the position shown in the drawing, the pendent switch completes the circuit of the generator field-magnet winding 7 for operating the main motor to return the planer table. The circuit of the field-magnet winding 7 extends from one terminal of the exciter generator 10 through the resistor 58, contact terminals 29 and 30, which are bridged by the segment 34, field-magnet winding 7, and the contact terminals 26 and 27, which are bridged by the contact segment 33 to the other terminal of the exciter generator.

If it is desired to operate the planer table in a cutting direction by means of the pendent switch, such switch is so rotated that the contact segment 33 bridges the contact terminals 28 and 29 and the contact segment 34 bridges the contact members 26 and 25. The direction of current flow through the field-magnet winding 7 is reversed to reverse the direction of rotation of the main motor 4.

If it is desired to operate the feed motor 5 continuously in a uniform direction, the switch 19 is thrown to its lower position. Thereupon, the circuit of the main motor 4 is broken to prevent further operation of such motor, and a circuit is completed for the armature 17 of the feed motor 5. The circuit through the armature 17 extends from one terminal of the generator 3 through the contact terminals 64 and 71, which are bridged by the switch blade 60, armature 17 and the contact terminal 69 to the other terminal of the generator 3. The circuit for the field-magnet winding 18 of the feed motor extends from one terminal of the exciter generator 10 through the contact terminals 67 and 72, which are bridged by the switch blade 61, field-magnet winding 18, contact terminals 70 and 74, which are bridged by the switch blade 62, and the contact terminals 40 and 38, to the other terminal of the exciter generator 10.

When the traverse switch 19 is in its lower position to effect continuous operation of the feed motor in a uniform direction, the switch 83 is operated to prevent intermittent operation of it by means of the limit switch 75. The circuit for operating the switch 83 extends from one terminal of the exciter generator 10 through the contact members 38 and 40, contact members 74 to 73, which are bridged by the switch blade 62, coil 84 and the contact member 72 to the other terminal of the exciter generator.

In the above described system, it should be noted the direction of rotation of the main motor is controlled solely by varying the circuit of the generator field-magnet winding while the feed motor is connected to such generator for operation intermittently in a uniform direction. The traverse switch in one position serves to permit the controlling of the various motors by means of the pendent switch, the pilot switch and the limit switch and when thrown to its opposite position insures the main motor against any operation while continuously operating the feed motor in a uniform direction.

While I have shown but one embodiment of my invention in which a planer is controlled, it is obvious that many modifications therein may occur to those skilled in the art and I desire, therefore, only such limitations to be placed on my invention as are imposed by the prior art or by the appended claims.

What I claim is:

1. In a control system, the combination with a motor-generator set, a main motor and a feed motor operated by said set, a pendent switch for controlling the excitation of the generator of said set to govern the main motor, a limit switch for controlling the feed motor, and a pilot switch for controlling the excitation of the generator of said set to govern the main and the feed motor, of a traverse switch for connecting the main and the feed motor across the terminals of said generator in one position thereof, said traverse switch in a second position serving to disconnect the main motor from the said generator and to connect the feed motor to said generator for continuous operation.

2. In a control system, the combination with a motor-generator set, and a main and a feed motor operated by said motor-generator set, of means for automatically varying the excitation of the generator of said set to control the direction of current flow therefrom to operate the main motor in a forward and a reverse direction and for operating the feed motor intermittently in a uniform direction, and means for insuring the main motor against operation and for continuously operating the feed motor.

3. In a control system for a planer, the combination with a motor-generator set, and a main and a feed motor operated by said set, of means controlled by the planer table for varying the excitation of the generator of said set to govern the direction of current flow therefrom to operate the main motor in a forward and in a reverse direction and for operating the feed motor intermittently in a uniform direction.

4. In a system of control, the combination with a motor-generator set, and a main and a feed motor, of means for reversing the polarity of the current generated by said set to reverse the direction of rotation of the main motor while maintaining the direction of rotation of the feed motor unchanged, and means comprising a transfer switch for intermittently operating each of said motors in one position of the switch and for continuously operating the feed motor while preventing operation of the main motor in a second position of the switch.

5. In a system of control, the combination with a motor-generator set, a shunt-wound main motor and a shunt-wound feed motor, said motors being supplied with current from the motor-generator set, of means for reversing the direction of current flow from said set to reverse the direction of rotation of the main motor while maintaining the direction of rotation of the feed motor unchanged, and means comprising a transfer switch for intermittently operating each of said motors in one position of the switch and for continuously operating the feed motor while preventing operation of the main motor in the second position of the switch.

6. In a system of control, the combination with a motor-generator set, a shunt-wound main motor and a shunt-wound feed motor, the armature and the field-magnet winding of said feed motor and the armature of the main motor being energized from said set, and an auxiliary source of current for energizing the field-magnet winding of the main motor and the field-magnet winding of the generator for said set, of means for varying the direction of the current flow through the field-magnet winding of the generator for controlling the direction of rotation of the main motor.

7. In a system of control for a planer, the combination with a motor-generator set, a shunt-wound main motor and a shunt-wound feed motor, the armature and the field-magnet winding of said feed motor and the armature of the main motor being energized from said set, and an auxiliary source of current for energizing the field-magnet winding of the main motor and the field-magnet winding, of the generator for said set, of means comprising a pendent switch for controlling the direction of current flow through the generator field-magnet winding to govern the direction of rotation of the main motor, a pilot switch for controlling the direction of current flow through the generator field-magnet winding in accordance with the operation of the planer table, and means comprising a limit switch controlled by said pilot switch for intermittently operating the feed motor in a uniform direction.

8. In a system of control, the combination with a motor-generator set, and a main and a feed motor operated by said set, of means for varying the excitation of the generator of said set to control the direction of current flow therefrom, the direction of rotation of the main motor being controlled in accordance with the polarity of current generated by said set, means comprising a limit switch for intermittently operating the feed motor in a uniform direction, and means independent of said limit switch for continuously operating the feed motor.

9. In a control system for a planer, the combination with a motor-generator set, and a main and a feed motor operated from said set, of means for automatically varying the excitation of the generator of said set to control the direction of rotation of the main motor and for intermittently operating the feed motor in a uniform direction in accordance with the operation of the planer table, and means for continuously operating one of said motors while preventing operation of the other motor.

10. In a system of control, the combination with a motor-generator set, and a main and a feed motor operated by said set, of means comprising a pilot switch for varying the excitation of the generator of said set to control the direction of rotation of the main motor, means comprising a limit switch controlled by said pilot switch for intermittently operating the feed motor in a uniform direction, and means independent of said limit switch for continuously operating the feed motor in a uniform direction while insuring the main motor against operation.

11. In a system of control, the combination with a motor-generator set, and a main and a feed motor operated by said set, each of said motors having one terminal thereof permanently connected to the generator of said set, of means comprising a traverse switch for connecting the main motor armature across the generator of said set and for connecting the feed motor in circuit for intermittent operation in a uniform direction when in one position and for excluding the main motor from circuit and for connecting the feed motor in circuit for continuous operation in a uniform direction when in a second position.

In testimony whereof, I hereto affix my signature.

HAROLD L. BLOOD.